(12) United States Patent
Mangoyan et al.

(10) Patent No.: US 12,311,300 B2
(45) Date of Patent: May 27, 2025

(54) MID-PRESSURE WATER SEPARATION FOR ENVIRONMENTAL CONTROL SYSTEM

(71) Applicant: Hamilton Sundstrand Corporation, Charlotte, NC (US)

(72) Inventors: Raffi Mangoyan, Manchester, CT (US); Louis J. Bruno, Ellington, CT (US); Jessica M. Blamick, Pinehurst, NC (US); Thomas Taing, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/880,355

(22) Filed: Aug. 3, 2022

(65) Prior Publication Data

US 2024/0042360 A1 Feb. 8, 2024

(51) Int. Cl.
*B01D 45/16* (2006.01)
*B64D 13/06* (2006.01)
*F01D 25/32* (2006.01)
*F25B 9/00* (2006.01)
*F25B 9/06* (2006.01)
*F25B 43/00* (2006.01)

(52) U.S. Cl.
CPC .............. *B01D 45/16* (2013.01); *B64D 13/06* (2013.01); *F01D 25/32* (2013.01); *F25B 9/004* (2013.01); *F25B 9/06* (2013.01); *F25B 43/00* (2013.01)

(58) Field of Classification Search
CPC .......... B01D 5/0009; B01D 2259/4575; B01D 45/16; B01D 53/26; B01D 53/265; F25B 9/004; F25B 9/06; F25B 2500/14; B64D 13/06; B64D 2013/0603–0696; F01D 25/32

See application file for complete search history.

(56) References Cited

U.S. PATENT DOCUMENTS

| 1,678,844 | A | * | 7/1928 | Bradshaw | B01D 45/08 122/491 |
| 2,485,522 | A | * | 10/1949 | Andersen | B64D 13/06 62/402 |
| 2,819,590 | A | * | 1/1958 | Green | B64D 13/06 454/75 |
| 2,867,989 | A | | 1/1959 | McGuff | |

(Continued)

FOREIGN PATENT DOCUMENTS

| GB | 671567 A | * | 2/1950 |
| JP | 2002126429 A | * | 5/2002 |
| WO | WO-9112990 A1 | * | 9/1991 |

OTHER PUBLICATIONS

European Search Report for European Application No. 23188997.3; Report Mail Date Dec. 11, 2023 (10 Pages).

*Primary Examiner* — John M Zaleskas
(74) *Attorney, Agent, or Firm* — CANTOR COLBURN LLP

(57) ABSTRACT

A water separator for use in an environmental control system of an aircraft includes a body having a first upstream end, a second downstream end, and plurality of fluidly distinct flow channels extending between the first upstream end and the second downstream end. A flow of medium provided to the water separator is configured to flow through the plurality of fluidly distinct flow channels in parallel.

20 Claims, 4 Drawing Sheets

(56) References Cited

U.S. PATENT DOCUMENTS

| | | | | |
|---|---|---|---|---|
| 3,208,234 A * | 9/1965 | Messinger | ............ | B64D 13/06 165/145 |
| 3,355,905 A | 12/1967 | Berhold et al. | | |
| 3,405,511 A * | 10/1968 | Halter | ................ | B01D 45/08 55/440 |
| 3,520,114 A * | 7/1970 | Gross | .................. | B04C 3/04 209/710 |
| 3,849,095 A * | 11/1974 | Regehr | ............... | B01D 45/08 55/440 |
| 3,877,245 A * | 4/1975 | Edwards | ............... | F24F 5/0007 62/93 |
| 3,884,660 A * | 5/1975 | Perry, Jr. | ................ | B01D 45/12 55/455 |
| 4,141,706 A * | 2/1979 | Regehr | ................ | B01D 45/16 55/440 |
| 4,158,449 A * | 6/1979 | Sun | .................. | B01D 46/10 55/306 |
| 4,162,906 A * | 7/1979 | Sullivan | ............... | B04C 3/00 210/512.1 |
| 4,255,174 A * | 3/1981 | Simpson | ................ | B01D 45/16 55/306 |
| 4,352,273 A * | 10/1982 | Kinsell | ............... | F28D 9/0062 165/166 |
| 4,537,608 A * | 8/1985 | Koslow | ............... | B01D 50/20 55/347 |
| 4,602,925 A * | 7/1986 | Huffman | ............... | B01D 53/26 55/435 |
| 4,681,610 A * | 7/1987 | Warner | ................ | B01D 45/16 55/394 |
| 4,783,204 A * | 11/1988 | Roarty | ................ | G21C 15/16 55/393 |
| 4,802,901 A * | 2/1989 | Wurz | .................. | B01D 45/06 55/440 |
| 5,025,642 A * | 6/1991 | Brunskill | ............... | B64D 13/06 62/402 |
| 5,214,935 A * | 6/1993 | Brunskill | ............... | F24F 5/0085 62/402 |
| 5,885,333 A * | 3/1999 | Dix | .................. | B01D 45/14 96/208 |
| 5,915,469 A * | 6/1999 | Abramzon | ............... | B64D 13/00 165/146 |
| 6,257,003 B1 * | 7/2001 | Hipsky | ................ | B64D 13/06 62/88 |
| 6,540,817 B1 * | 4/2003 | Hachimaki | ............ | B01D 63/02 95/52 |
| 6,637,215 B1 * | 10/2003 | Leathers | ................ | B64F 1/362 62/401 |
| 6,884,273 B2 * | 4/2005 | Kopec | ..................... | B04C 3/04 55/346 |
| 7,837,752 B2 | 11/2010 | Darke et al. | | |
| 10,697,328 B2 | 6/2020 | Tan | | |
| 2002/0121103 A1 * | 9/2002 | Udobot | ................ | F28F 19/006 62/93 |
| 2004/0069243 A1 * | 4/2004 | Ishiguro | ............... | G21D 1/006 122/34 |
| 2006/0021356 A1 * | 2/2006 | Milde | ................ | B04C 3/06 62/93 |
| 2006/0275717 A1 * | 12/2006 | Jensen | ................ | B64D 13/00 431/11 |
| 2007/0281205 A1 * | 12/2007 | Wagner | ................ | F01M 13/04 429/49 |
| 2008/0022688 A1 * | 1/2008 | Decrisantis | ............ | B64D 13/06 60/751 |
| 2009/0139403 A1 * | 6/2009 | Darke | .................... | B01D 45/02 55/394 |
| 2010/0326025 A1 * | 12/2010 | Bratton | ................ | B01D 45/06 55/440 |
| 2010/0326026 A1 * | 12/2010 | Bratton | ................ | B01D 45/06 55/440 |
| 2014/0360708 A1 * | 12/2014 | Padovan | ............... | B01D 45/08 165/170 |
| 2015/0090119 A1 | 4/2015 | Au et al. | | |
| 2017/0045243 A1 * | 2/2017 | Zazueta | ............... | F24F 3/1405 |
| 2018/0133634 A1 * | 5/2018 | Zager | .................... | F25B 9/004 |
| 2018/0250620 A1 * | 9/2018 | Vingelven | ............ | B01D 45/08 |
| 2019/0105590 A1 * | 4/2019 | Friestad | ................ | B64D 13/06 |
| 2019/0366251 A1 | 12/2019 | Langen et al. | | |
| 2019/0388818 A1 * | 12/2019 | Martin | ................ | B01D 45/16 |
| 2020/0179851 A1 * | 6/2020 | Palmer | ................ | B01D 53/265 |
| 2021/0102743 A1 * | 4/2021 | Elsherbini | ................ | F28F 1/40 |
| 2021/0107058 A1 * | 4/2021 | Ruh | ........................ | B22F 10/28 |
| 2021/0229013 A1 * | 7/2021 | Friestad | ................ | B64D 13/06 |
| 2022/0032219 A1 * | 2/2022 | Army | ................ | B01D 46/0039 |
| 2022/0111968 A1 * | 4/2022 | Rambo | ................ | F02C 7/185 |
| 2022/0111969 A1 * | 4/2022 | Rambo | ................ | B64D 13/06 |
| 2022/0411073 A1 * | 12/2022 | Army | ..................... | B01D 45/04 |
| 2023/0077365 A1 * | 3/2023 | Ho | ............................ | F25B 9/06 |
| 2023/0166845 A1 * | 6/2023 | McCord | ................ | B01D 45/08 244/118.5 |
| 2023/0191295 A1 * | 6/2023 | McCord | ................ | B64D 13/06 95/271 |

\* cited by examiner

MID-PRESSURE WATER SEPARATION FOR ENVIRONMENTAL CONTROL SYSTEM

BACKGROUND

Embodiments of the present disclosure relate to environmental control systems for a vehicle, and more particularly, to a water separator suitable for use in an environmental control system of an aircraft.

In existing environmental control systems, an air flow is typically cooled within a heat exchanger then provided to a water collector located downstream from the heat exchanger to capture or remove any free moisture from the airflow. The water collector typically includes a separation device that directs the moisture present within the airflow to outer walls of the separation device and directs the free moisture towards a drain port. Often times the heat exchanger and the water collector is substantially bulky and consume large amounts of space.

BRIEF DESCRIPTION

According to an embodiment, a water separator for use in an environmental control system of an aircraft includes a body having a first upstream end, a second downstream end, and plurality of fluidly distinct flow channels extending between the first upstream end and the second downstream end. A flow of medium provided to the water separator is configured to flow through the plurality of fluidly distinct flow channels in parallel.

In addition to one or more of the features described above, or as an alternative to any of the foregoing embodiments an interior surface of a region of at least one of the plurality of fluidly distinct flow channels is textured.

In addition to one or more of the features described above, or as an alternative to any of the foregoing embodiments a surface area at the region is increased relative to the surface area at another region of the at least one of the plurality of fluidly distinct flow channels that is not textured.

In addition to one or more of the features described above, or as an alternative to any of the foregoing embodiments at least one of the plurality of fluidly distinct flow channels has a spiral-like configuration about a longitudinal axis of the body.

In addition to one or more of the features described above, or as an alternative to any of the foregoing embodiments a direction of the spiral-like configuration about the longitudinal axis and the direction of a spin of the flow of medium provided to the water separator is the same.

In addition to one or more of the features described above, or as an alternative to any of the foregoing embodiments a direction of the spiral-like configuration about the longitudinal axis and the direction of a spin of the flow of medium provided to the water separator is different.

In addition to one or more of the features described above, or as an alternative to any of the foregoing embodiments a configuration of each of the plurality of fluidly distinct flow channels is substantially identical.

In addition to one or more of the features described above, or as an alternative to any of the foregoing embodiments a configuration of each of the plurality of fluidly distinct flow channels varies.

In addition to one or more of the features described above, or as an alternative to any of the foregoing embodiments a configuration of at least one of the plurality of fluidly distinct flow channels is constant between the first upstream end and the second downstream end.

In addition to one or more of the features described above, or as an alternative to any of the foregoing embodiments a configuration of at least one of the plurality of fluidly distinct flow channels varies between the first upstream end and the second downstream end.

In addition to one or more of the features described above, or as an alternative to any of the foregoing embodiments a clearance is defined between the plurality of fluidly distinct flow channels, and the clearance varies between the first upstream end and the second downstream end.

In addition to one or more of the features described above, or as an alternative to any of the foregoing embodiments an outer diameter of the body varies between the first upstream end and the second downstream end.

In addition to one or more of the features described above, or as an alternative to any of the foregoing embodiments comprising a swirl-inducing insert arranged within at least one of the plurality of fluidly distinct flow channels According to an embodiment, an environmental control system includes a turbine configured to extract energy and heat from a medium and a water separator arranged directly downstream from the turbine. The water separator includes a body having a first upstream end, a second downstream end, and plurality of fluidly distinct flow channels extending between the first upstream end and the second downstream end. The medium provided to the water separator is configured to flow through the plurality of fluidly distinct flow channels in parallel.

In addition to one or more of the features described above, or as an alternative to any of the foregoing embodiments comprising a duct extending from an outlet of the turbine, wherein the water separator is positioned within the duct and an outer diameter of the water separator is equal to an inner diameter of the duct.

In addition to one or more of the features described above, or as an alternative to any of the foregoing embodiments the water separator is permanently affixed to the duct.

In addition to one or more of the features described above, or as an alternative to any of the foregoing embodiments the water separator is removably mounted to the duct.

In addition to one or more of the features described above, or as an alternative to any of the foregoing embodiments the water separator is configured to impart a swirl to the medium within at least one of the plurality of fluidly distinct flow channels.

In addition to one or more of the features described above, or as an alternative to any of the foregoing embodiments an interior surface of a region of at least one of the plurality of fluidly distinct flow channels is textured and a surface area at the region is increased relative to the surface area at another region of the at least one of the plurality of fluidly distinct flow channels that is not textured.

In addition to one or more of the features described above, or as an alternative to any of the foregoing embodiments comprising a water collector arranged downstream from and in fluid communication with the water separator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
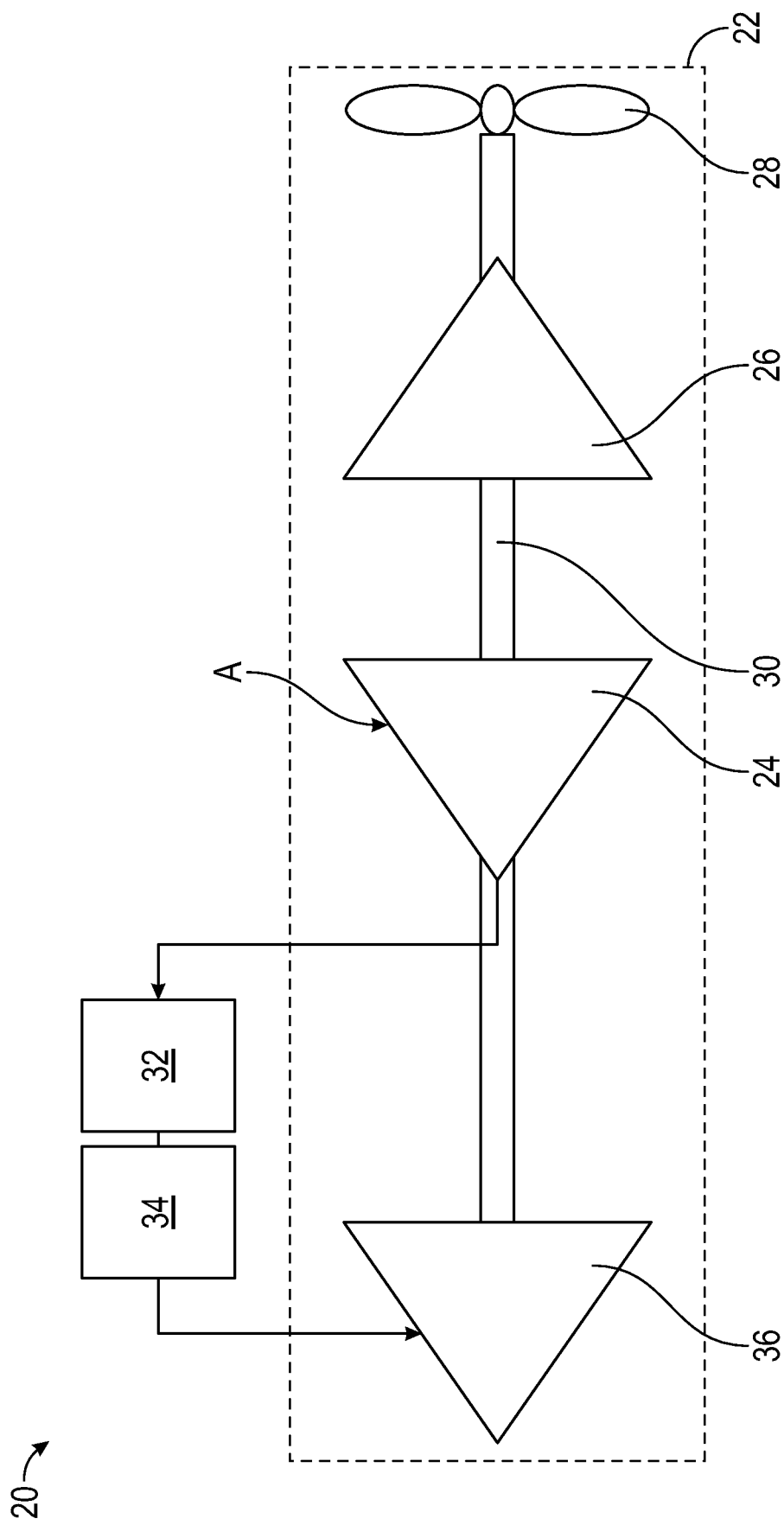
FIG. 1 is a schematic diagram of a portion of an environmental control system according to an embodiment.

With reference now to the FIG. 1, an exemplary portion of an environmental control system 20, such as part of a pack of an environmental control system for example, is illustrated. As shown, the environmental control system (ECS) pack 20 includes an air cycle machine 22 having a turbine 24, and in some embodiments includes one or more other components, such as a compressor 26 and a fan 28 operably coupled to the turbine 24 by a rotatable shaft 30 for example. In the illustrated, non-limiting embodiment, a water separator 32 and a water collector 34 arranged in series are located downstream from, and in some embodiments directly downstream from the outlet of the turbine 24. However, it should be understood that embodiments where the water separator 32 and water collector 34 in combination are arranged downstream from any suitable component of the ECS 20 are also contemplated herein. In an embodiment, the water separator 32 is positioned within the ECS 20 to receive a flow of medium, such as a fluid or air A for example, that is cool and has condensed water vapor entrained or suspended therein resulting in a fog-like consistency.

In the illustrated, non-limiting embodiment, the cool, dry medium output from the water collector 34 is provided to a second turbine 36. Although the second turbine 36 is illustrated as being arranged directly downstream from the water collector 34, it should be appreciated that in other embodiments, one or more additional components may be arranged between the outlet of the water collector 34 and the second turbine 36. Further, although the turbine 36 is illustrated as being part of the air cycle machine 22, embodiments where the turbine 36 is separate from the air cycle machine 22 are also within the scope of the disclosure.

Figure 2:
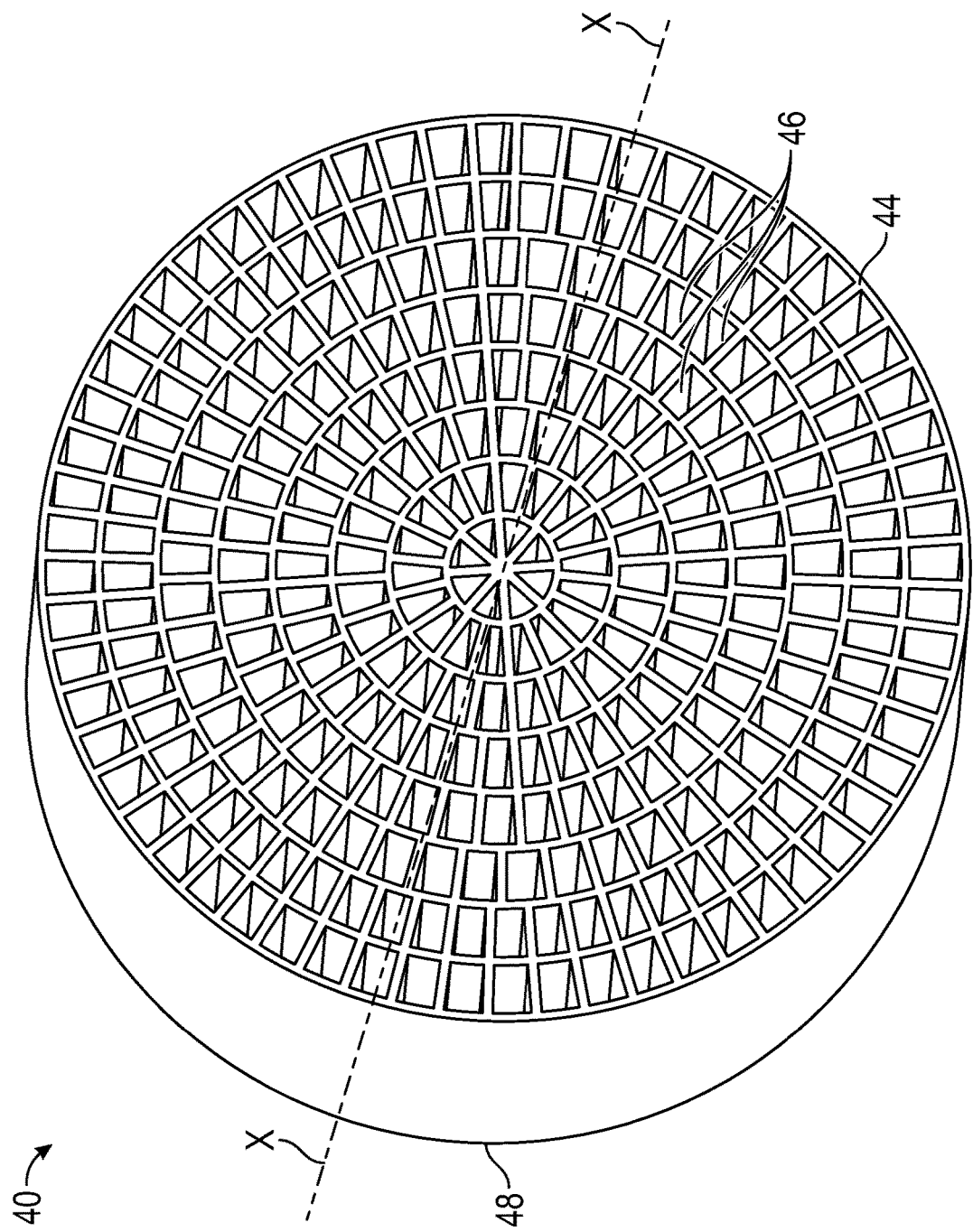
FIG. 2 is a perspective view of a water separator according to an embodiment.
Figure 3:
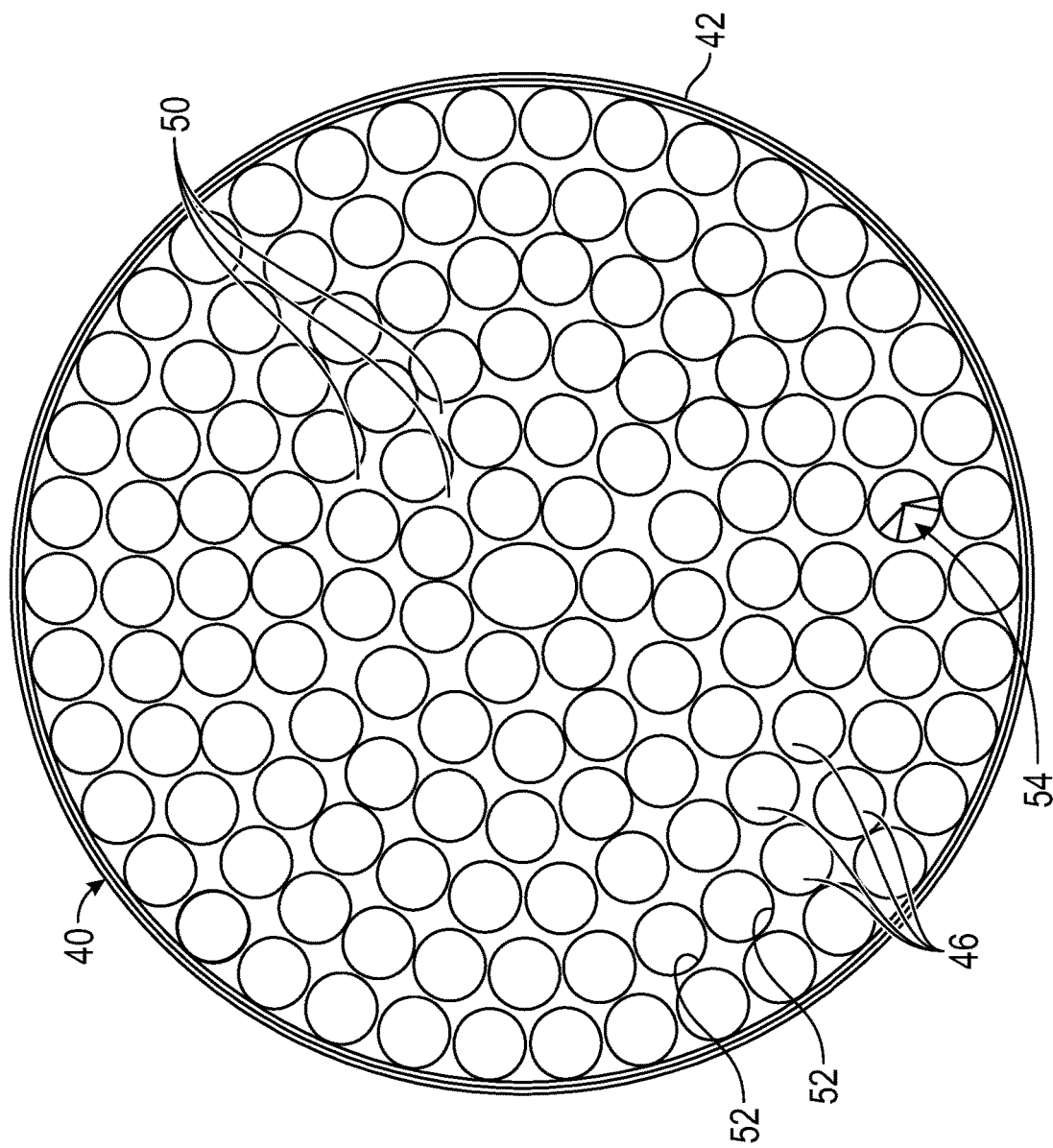
FIG. 3 is a plan view of a water separator according to another embodiment.
Figure 4:
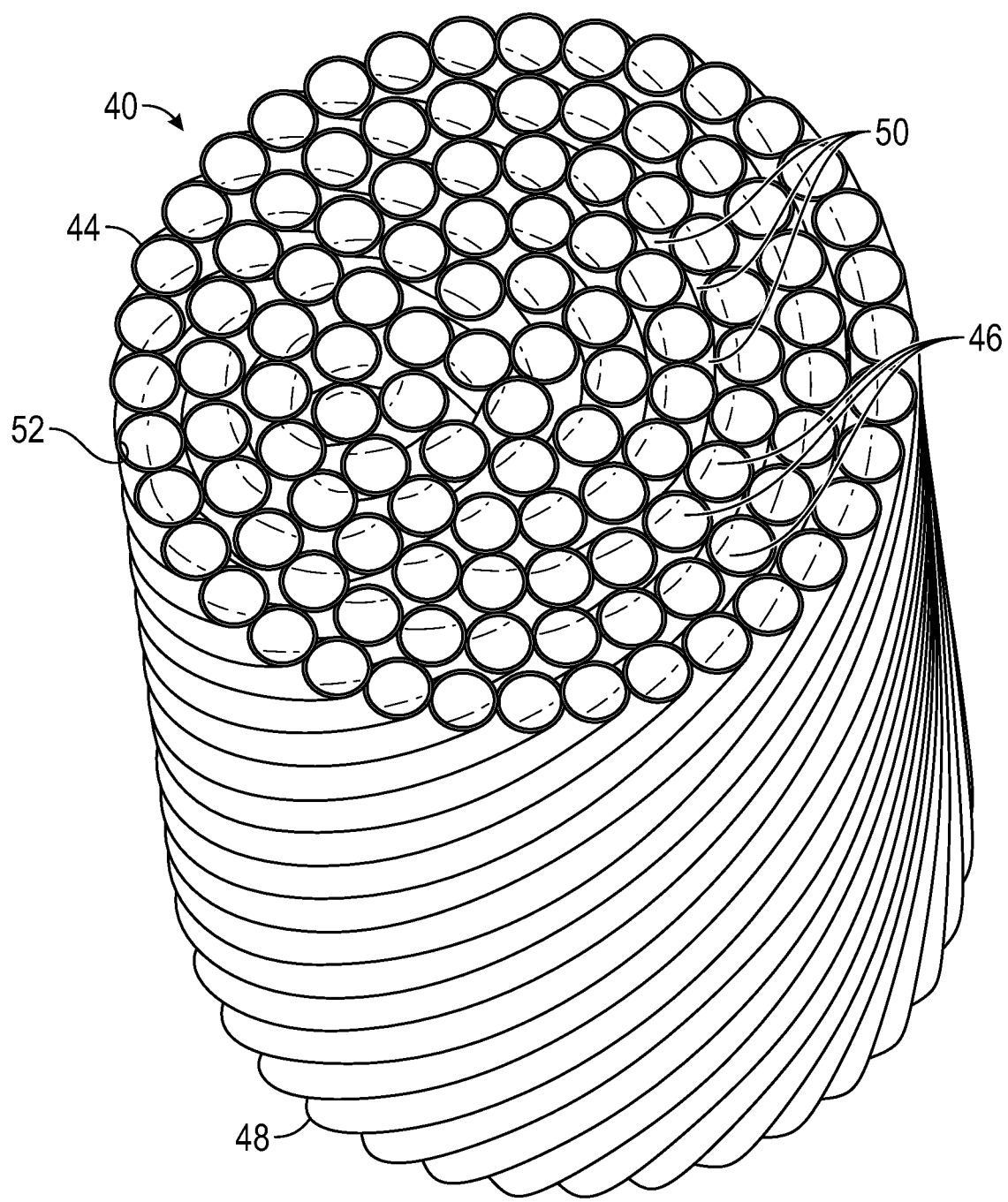
FIG. 4 is a perspective view of the water separator of FIG. 3 according to an embodiment.

With reference now to FIGS. 2-4, various non-limiting embodiments of a water separator 40, such as water separator 32 for example, are shown in more detail. In the illustrated, non-limiting embodiments, the water separator 40 is an insert positionable within a duct or conduit 42 (see FIG. 3) connected to a component of an environmental control system. The water separator 40 may be arranged within the duct 42 at any suitable location, such as downstream from the an outlet of the turbine 24 and upstream from the inlet of the water collector 40. In embodiments where the water separator 40 is an insert, the water separator 40 may be permanently or removably mountable within the interior of the duct 42, or to a portion of the turbine 24. Alternatively, the water separator 40 may be integrally formed with the duct 42 or the outlet of the turbine 24, such as via an additive manufacturing process for example.

In the illustrated, non-limiting embodiment, the water separator 40 has a body that is generally cylindrical in shape. However, it should be understood that embodiments where a cross-section of the water separator 40 is a shape other than a circle, such as a square, rectangle, triangle, or other suitable shape are also contemplated herein. In an embodiment, the shape and size of at least a portion of the water separator 40 is complementary to or substantially identical to the interior surface of the duct 42. For example, an outer diameter of the first upstream end 44 of the water separator 40 may substantially equal to the inner diameter of the duct 42. Accordingly, when the water separator 40 is arranged at an interior of the duct 42, a minimal amount of the medium, and in some embodiments, none of the medium, is configured to flow between the exterior of the water separator 40 and the interior surface of the duct 42.

As shown, the water separator 40 includes a plurality of fluidly distinct flow channels 46 extending between the first upstream end 44 of the water separator 40 and a second, downstream end 48 of the water separator 40. The plurality of flow channels 46 may be any suitable shape and are configured to minimize the pressure drop of the flow of medium as it passes therethrough, increase the efficiency of the flow of medium, or some combination thereof. As shown in FIG. 2, the flow channels 46 may be formed by the intersection of a plurality of circular lines and a plurality of straight lines, resulting in flow channels 46 that are generally trapezoidal or triangular in shape. In the non-limiting embodiment of FIGS. 3 and 4, the flow channels 46 have a generally rounded contour, such as a circular configuration for example. Accordingly, it should be understood that a flow channel 46 having any shape is within the scope of the disclosure. Although the first upstream end 44 of each of the flow channels 46 is illustrated as being generally uniform in size and/or shape in FIGS. 3 and 4, or in other embodiments, the size and/or shape of the first upstream end 44 of the flow channels 46 may vary between adjacent flow channels 46 as shown in FIG. 2.

Further, the size and/or shape of each flow channel 46 may be generally constant over the axial length of the water separator 40, or alternatively, may vary between the first upstream end 44 and the second downstream end 48 thereof. For example, one or more of the flow channels 46 may increase or decrease in size over the length of the water separator 40. In embodiments where at least one of the size and shape of a flow channel 46 varies, it should be understood that the variation between adjacent flow channels 46 may be the same or may be different. In an embodiment, the clearance 50 between adjacent flow channels 46, such as represented by the gaps between the circular flow channels 46 in FIGS. 3 and 4 for example, may vary over the length of the water separator 40. In an embodiment, the clearance 50 between the flow channels 46 is greater at the first upstream end 44 than at the second downstream end 48. Such a reduction may, but need not be gradual over the length of the water separator 40. As a result of this reduction in clearance 50, the outer diameter of the water separator 40 at the second downstream end 48 may be less at the first upstream end 44. Further, although the clearance 50 is illustrated and described herein as decreasing from the first upstream end 44 towards the second downstream end 48, embodiments where the clearance 50 increases from the first upstream end 44 towards the second downstream end 48 are also contemplated herein The interior surface 52 of each flow channel 46 may be substantially smooth. In other embodiments, at least a portion of the interior surface 52 of one or more of the flow channels 46 may be textured or roughened. Inclusion of such texture may increase the overall surface area of the interior surface 52 of the flow channel 46 at that region.

In some embodiments, one or more of the flow channels 46 has a substantially axial configuration (FIG. 2) that extends generally parallel to the longitudinal axis of the water separator 40. As a result, the flow of medium A is configured to flow axially between the first and second ends 44, 48 of the water separator 40. In other embodiments, a swirl may be imparted to the medium within one or more of the flow channels 46 of the water separator 40. In an embodiment, a swirl-inducing insert 54, such as a turbulator having one or more coalescing features that extend into and interrupt the flow of medium, may be arranged within a flow channel 46, thereby causing the flow to swirl within the flow channel 46.

Alternatively, or in addition, at least one of the flow channels 46 is configured to wrap about the longitudinal axis X of the water separator 40 in a spiral-like configuration. In such embodiments, the flow of medium within the flow channel 46 is configured to spin or swirl about the axis X of the water separator 40. The direction of the spiral of the at least one flow channel 46 may be the same as the spin acting on the medium output from the turbine 24, or alternatively, may be in opposite the direction of the spin acting on the medium output from the turbine 24. In embodiments where a plurality of the flow channels 46 have a spiral-like configuration, it should be appreciated that the circumferential distance of the spiral about the central axis X applied to flow channels 46 may vary, such as based on the position of the flow channel 46 relative to the insert (such as closed to the center vs. the outer periphery).

In an embodiment, to ensure that a minimum amount of swirl is applied to the flow passing through the flow channels 46 having a spiral-like configuration, the first upstream end 44 of one or more of the flow channels 46 of the water separator 40 may be blocked to restrict or prevent flow therethrough. However, it should be understood that a first upstream end 44 of one or more of the flow channels 46 may be blocked to control a flow through the water separator 40 even in embodiments where none of the flow channels 46 have a spiral-like configuration.

In operation, as the flow of medium A output from a component, such as the turbine 24 for example, passes through the plurality of flow channels 46 of the water separator 40 in parallel, moisture within the flow of medium will coalesce in the form of droplets on the interior surface 52 of the flow channels 46. As a result, a flow of drier medium A will be arranged at the center of each flow channel 46. During this coalescing, the flow of medium A will cause these droplets formed on the interior surface of the flow channels 46 to move through the flow channels 46 for collection within the water collector 34 positioned directly downstream from the water separator 40. The water collector 34 may be a conventional water collector as is known in the art.

A water separator 40 as illustrated and described herein facilitates, and in some embodiments maximizes, the separation of water from an airflow within a small sizing envelope. As a result, the overall packaging of the ECS pack may be reduced, and the pressure drop of the medium within the water separator may be minimized. The water separator 40 may be particularly useful for removing water from an airflow when the water is in the form or a mist or fog, such as may be received from an outlet of a turbine. Further, by using the water separator 40 in an ECS pack 20 having two turbines 24, 36 arranged in series relative to the flow of medium A, the first turbine 24 may be configured to maintain the temperature of the medium A above freezing, whereas the second turbine 36 may be configured to achieve a necessary pressure and/or temperature of the medium to be provided to a load.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water separator for use in a duct of an environmental control system of an aircraft comprising:
    an insert mountable within the duct, the insert includes:
        a body having a circular cross-sectional shape and having a central longitudinal axis, an outer diameter of the body being equal to an inner diameter of the duct;
        an inlet arranged at a first upstream end of the body;
        an outlet arranged at a second downstream end of the body;
        and a plurality of flow channels extending through the body from the first upstream end to the second downstream end, the plurality of flow channels being enclosed within an interior of the insert, wherein each flow channel of the plurality of flow channels is fluidly separate from a remainder of the plurality of flow channels over an entire distance between the inlet and the outlet of the body;
        wherein the plurality of flow channels includes at least one flow channel arranged radially outwardly from another flow channel and a flow of medium provided to the water separator is configured to flow along the longitudinal axis and through the plurality of flow channels of the insert in parallel.

2. The water separator of claim 1, wherein an interior surface of a region of at least one of the plurality of flow channels is textured.

3. The water separator of claim 2, wherein a surface area at the region is increased relative to the surface area at another region of the at least one of the plurality of fluidly distinct flow channels that is not textured.

4. The water separator of claim 1, wherein at least one of the plurality of flow channels has a spiral-like configuration about the longitudinal axis of the body.

5. The water separator of claim 4, wherein a direction of the spiral-like configuration about the longitudinal axis and a direction of a spin of the flow of medium provided to the water separator is the same.

6. The water separator of claim 4, wherein a direction of the spiral-like configuration about the longitudinal axis and a direction of a spin of the flow of medium provided to the water separator is different.

7. The water separator of claim 1, wherein a configuration of each of the plurality of fluidly distinct flow channels is identical.

8. The water separator of claim 1, wherein a configuration of each of the plurality of flow channels varies.

9. The water separator of claim 1, wherein a configuration of at least one of the plurality of flow channels is constant between the first upstream end and the second downstream end.

10. The water separator of claim 1, wherein a configuration of at least one of the plurality of fluidly distinct flow channels varies between the first upstream end and the second downstream end.

11. The water separator of claim 1, wherein a clearance is defined between the plurality of flow channels, and the clearance varies between the first upstream end and the second downstream end.

12. The water separator of claim 1, wherein an outer diameter of the body varies between the first upstream end and the second downstream end.

13. The water separator of claim 1, further comprising a swirl-inducing insert arranged within at least one of the plurality of flow channels.

14. An environmental control system comprising:
a turbine configured to extract energy and heat from a medium;
a duct; and
a water separator arranged directly downstream from the turbine, the water separator including:
an insert mounted within the duct, the insert including:
a body having a circular cross-sectional in shape and having a central longitudinal axis;
an inlet arranged at a first upstream end;
an outlet arranged at a second downstream end; and
a plurality of distinct flow channels extending through the body between the first upstream end and the second downstream end, each of the plurality of flow channels being enclosed within an interior of the insert, wherein each flow channel of the plurality of flow channels is fluidly separate from a remainder of the plurality of flow channels over an entire distance between the inlet and the outlet of the body;
wherein the plurality of flow channels includes at least one flow channel arranged radially outwardly from another flow channel and the medium provided to the water separator is configured to flow along the longitudinal axis and through the plurality of flow channels in parallel.

15. The environmental control system of claim 14, further comprising a duct extending from an outlet of the turbine, wherein the water separator is positioned within the duct and an outer diameter of the water separator is equal to an inner diameter of the duct.

16. The environmental control system of claim 15, wherein the water separator is permanently affixed to the duct.

17. The environmental control system of claim 15, wherein the water separator is removably mounted to the duct.

18. The environmental control system of claim 14, wherein the water separator is configured to impart a swirl to the medium within at least one of the plurality of flow channels.

19. The environmental control system of claim 14, wherein an interior surface of a region of at least one of the plurality of flow channels is textured and a surface area at the region is increased relative to the surface area at another region of the at least one of the plurality of flow channels that is not textured.

20. The environmental control system of claim 14, further comprising a water collector arranged downstream from and in fluid communication with the water separator.

* * * * *